UNITED STATES PATENT OFFICE.

CHARLES PAUL BARY, OF PARIS, FRANCE, ASSIGNOR TO HENRY PIERRE CHARLES GEORGES DEBAUGE, OF PARIS, FRANCE.

PROCESS FOR REGENERATING VULCANIZED RUBBER.

1,079,464. Specification of Letters Patent. Patented Nov. 25, 1913.

No Drawing. Application filed May 1, 1912. Serial No. 694,567.

*To all whom it may concern:*

Be it known that I, CHARLES PAUL BARY, a citizen of the Republic of France, residing in Paris, France, have invented certain new and useful Improvements in Processes for Regenerating Vulcanized Rubber, of which the following is a specification.

In specification of my U. S. application, Serial No. 568,661, filed June 24, 1910 I have explained that the presence of a metal oxid facilitates the devulcanization of rubber by hot hydrocarbons or other solvents, by fixing the sulfur liberated in the change. The oxids which were recommended are such as are capable of forming oxysulfids by combining with sulfur, such as oxids of iron, zinc, lead, copper or the like.

The present invention relates to an improvement in that described in the said specification in that the oxid used is one which contains so much oxygen as is necessary to oxidize the sulfur and form with it a sulfate of the metal, because the sulfate is insoluble in the solvent and is easily separated therefrom.

The simple oxids which contain a small quantity of oxygen do not permit the formation of sulfates; it is necessary to employ in this case the higher oxids of metals having more than one degree of oxidation, such as $MnO_2$, $PbO_2$, or the like. The reaction whereby the sulfur is fixed is of the following form:

With di-oxid of lead:
$$3PbO_2 + S = PbSO_4 + 2PbO.$$
With minium:
$$3Pb_3O_4 + S = PbSO_4 + 8PbO.$$
With manganese di-oxid:
$$4MnO_2 + S = MnSO_4 + Mn_3O_4$$
and
$$3Mn_3O_4 + S = MnSO_4 + 8MnO.$$
With ferric oxids:
$$8Fe_2O_3 + S = FeSO_4 + 5Fe_3O_4$$
and
$$3Fe_3O_4 + S = FeSO_4 + 8FeO.$$

These examples show that the reaction is always of the same form; reduction of the oxid into another less oxygenated, and formation of sulfate.

Claim:

Improved process for devulcanizing rubber consisting in treating it with a solvent in presence of a metal peroxid capable of fixing the sulfur by oxidation of the sulfur and formation of a metal sulfate which is insoluble in the solvent and is easily separated therefrom.

In witness whereof, I have hereunto signed my name in the presence of two subscribing witnesses.

CHARLES PAUL BARY.

Witnesses:
H. C. COXE,
RENÉ BARDY.